July 28, 1925.
E. JACOBUS
THERMOSTATIC VENT VALVE FOR RADIATORS
Filed Nov. 8, 1923
1,547,652
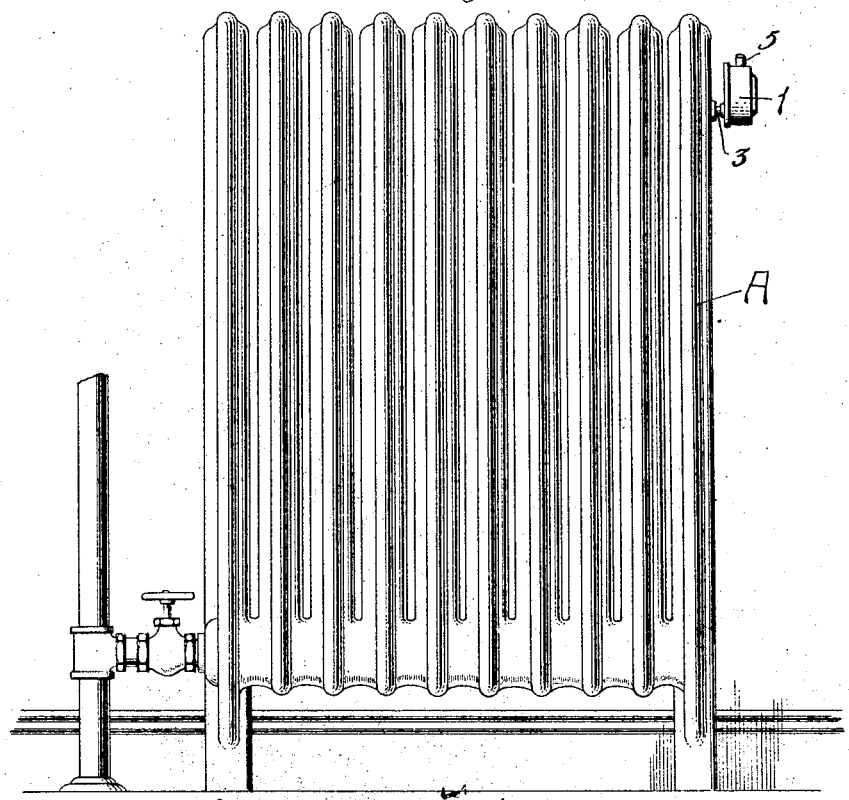
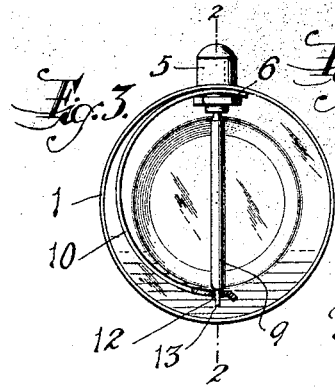
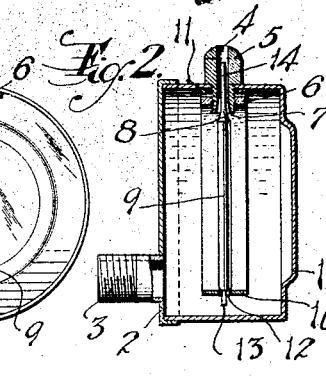
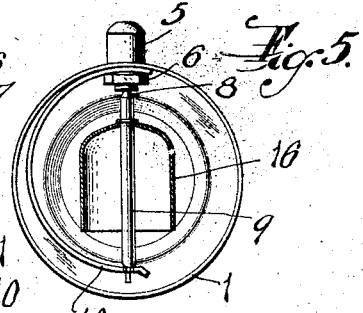
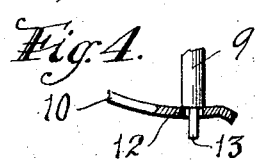
INVENTOR.
Edward Jacobus,
BY
ATTORNEYS.

Patented July 28, 1925.

1,547,652

UNITED STATES PATENT OFFICE.

EDWARD JACOBUS, OF MONTCLAIR, NEW JERSEY.

THERMOSTATIC VENT VALVE FOR RADIATORS.

Application filed November 8, 1923. Serial No. 673,453.

*To all whom it may concern:*

Be it known that I, EDWARD JACOBUS, a citizen of the United States, and a resident of Montclair, in the county of Essex and State of New Jersey, have invented certain new and useful Improvements in Thermostatic Vent Valves for Radiators, of which the following is a specification.

This invention relates in general to thermostatic valves to control the flow of a fluid or fluids therethrough in accordance with the temperature of the fluids and more particularly the invention relates to a valve having thermostatically controlled means for holding the valve open to permit fluids of a certain range of temperatures to pass therethrough and closing the valve to prevent fluids of temperatures above said range from escaping through the valve.

The primary object of the invention is to provide a valve of the character described embodying novel and improved features of construction whereby the valve shall be thoroughly dependable and accurate in operation under all the usual working conditions and shall be capable of withstanding hard usage and handling without possibility of such injury thereto as would detrimentally affect working adjustment or operation thereof.

Another object is to provide a valve of the character described comprising a substantially cylindrical casing having a radial outlet and a semi-circular thermostatic strip for operating a valve to control said outlet so arranged as to produce quick and accurate closing of the valve upon influx of steam or hot fluid into the casing.

Further objects are to provide such a valve including a substantially semi-circular strip of thermostatic metal secured at one end to the casing of the valve with the other end disposed substantially opposite and distantly spaced from the valve seat, and an elongated valve rod so mounted at one end on said second-mentioned end of the thermostatic strip and having a valve head so constructed that said second-mentioned end of said strip may be positioned to one side of the axis of the valve seat or move transversely of said seat in any direction without affecting proper cooperation of the valve head with said valve seat; to provide a valve of this character in which a float may be connected to said valve rod to move the rod independently of said thermostatic strip into engagement with the valve seat to prevent a liquid from escaping through the valve; to provide such a valve which shall be simple and inexpensive in construction, quick in operation, and require no adjustment after installation, and to obtain other results and advantages as may be brought out by the following description.

For the purpose of illustrating the principles of the invention, I have shown the same embodied in an air vent valve for radiators utilized particularly in steam heating systems, the purpose of the valve being to permit air to be ejected from the radiator by the incoming steam and prevent the escape of steam after all of the air has been ejected from the radiator. However, it will be understood that the invention is susceptible of use for other purposes, and that I do not desire to be understood as limting myself in the use of the invention except as may be required by the prior art.

In said drawings in which the same reference characters indicate corresponding and like parts, Figure 1 is a side elevation of a valve constructed in accordance with my invention, showing the same applied to a radiator;

Figure 2 is an enlarged transverse vertical sectional view through the valve taken on the line 2—2 of Figure 3;

Figure 3 is an end elevation of the valve with one end wall removed, showing the mounting of the thermostatic strip and the valve rod;

Figure 4 is an enlarged detached partial sectional and partial side elevational view of the connection of the valve rod with the thermostatic strip, and Figure 5 is a view similar to Figure 3 showing a modification of the invention to adapt the valve for preventing escape of a liquid therethrough.

In the specific embodiment of the invention shown on the drawings, the reference character 1 designates a substantially hollow cylindrical casing closed at both ends, said casing being conveniently formed of sheet metal by a drawing operation and having one end in the form of a cover 2 to which is secured a threaded nipple 3 for connecting the valve to a radiator A of a steam heating system. The casing 1 is provided at one side thereof with an outlet passage 4 which may be formed in a nipple 5 secured to the casing by means of a nut 6 threaded on the inner end thereof. The inner end of said nipple 5 is formed with a valve seat 7 with which cooperates a valve head 8 carried by a valve rod 9 mounted on a curved strip 10 of thermostatic metal, one end of which is secured to the casing adjacent to valve seat 7.

In the present instance one end of the thermostatic strip 10 is provided with an opening 11 to slip over the inner end of the nipple 5 between the nut 6 and the casing, whereby the strip is securely fastened to the interior of the casing. The opposite end of the thermostatic strip is disposed substantially opposite the valve seat 7 and distantly spaced therefrom, said end being provided with a transverse opening 12 for supporting the valve rod 9.

The valve rod 9 is of a length to extend between the free end of the thermostatic strip and the valve seat 7, and the end of said rod opposite the valve head 8 is provided with a reduced portion 13 loosely fitted within the opening 12 in the thermostatic strip 10. The end of the rod 9 outwardly of the valve head 8 is reduced at 14 to a diameter less than that of the outlet passage 4, said reduced end 14 serving to hold the valve head in position to engage the valve seat 7.

In the operation of the valve, when the radiator A is filled with air and steam is admitted thereto, the thermostatic strip 10 is distended so as to maintain the valve head 8 out of engagement with the seat 7 and permit the escape of air. When steam enters the valve casing 1, the thermostatic strip is expanded so as to cause the free end thereof to move toward and transversely of the valve seat 7. This action exerts a longitudinal thrust on the valve rod 9 which causes the valve head 8 to engage the seat 7 and prevent the escape of steam through the outlet 4.

With this construction, it will be observed that the opening 12 in the strip 10 and the reduced portion 13 of the rod 9 permit substantial movement of the free end of the strip 10 transversely of the valve seat 7 in any direction without in any way affecting the proper engagement of the valve head with the valve seat. Also, the free end of the strip 10 might be positioned to one side of the axis of the valve seat 7, as by a blow upon the valve casing or rough handling thereof, without affecting proper cooperation of the valve head and seat. Furthermore, the substantially semi-circular shape of the strip 10 ensures a quick action of the valve and a strip of such shape is less likely to become so accidentally bent as to impair the operation of the valve. For instance, I have found that a valve with my semi-circular thermostatic strip will quickly and accurately close with only two ounces of steam pressure, whereas other known thermostatic valves will not close with less than one to five pounds of pressure. The distantly spaced relation of the free end of the thermostatic strip and the valve seat 7 in connection with the elongated valve rod 9, greatly minimizes the effect of transverse movement of the free end of the strip 10 on the valve head 8, since any angular relation of the valve head with the valve seat would be much less with this construction than one with the free end of the thermostatic strip closely adjacent the valve seat. The valve is practically self-adjustable so as to be always positive and reliable in operation without requiring any special attention after once being installed.

It will be understood that the thermostatic strip 10 may be formed of any suitable metal and in any suitable manner to accomplish the desired result, and that the connection of the valve rod with the thermostatic strip may be any suitable one as will permit the relative movement of the strip and valve rod to accomplish the objects of the invention. The valve is simple and inexpensive in construction, and the particular shape of the thermostatic stripe is especially adapted for use in a substantially cylindrical casing as shown, which is artistic and pleasing in appearance.

When it is desired to adapt the valve to prevent the escape of water therethrough, a bell or float 16 may be rigidly secured to the valve rod 9, said float being so positioned with respect to the inlet 3 of the casing 1 that water entering the casing will raise the float and move the valve rod 9 so as to cause closing engagement of the valve head and valve seat 7. It will be noted that the connection of the valve rod 9 with thermostatic strip is particularly adapted for permitting the relative movement of the valve rod and the thermostatic strip as is necessary where a float as described is used.

Obviously, the details of construction of the valve may be modified or changed by those skilled in the art without departing from the spirit or scope of the invention, and therefore I do not desire to be understood as limiting myself except as required by the following claims when construed in the light of the prior art.

Having thus described the invention, what I claim is:

1. A valve of the character described, comprising a substantially cylindrical casing having an inlet and an outlet, a substantially semi-circular thermostatic strip within said casing and having one end fixedly secured to said casing adjacent said outlet with the other end spaced substantially opposite said outlet and movable toward and from the outlet upon influx of hot and cold fluid respectively into said casing, a valve rod mounted on the inner side of the second-mentioned end of said strip and movable longitudinally with and relatively to said strip toward and from said outlet, and a float fixedly connected to said valve rod between said strip and said outlet to actuate said valve rod independently of said strip to close said outlet upon influx of liquid into said casing.

2. A valve of the character described, comprising a substantially cylindrical casing having an inlet and an outlet, a substantially semi-circular thermostatic strip within said casing and having one end fixedly secured to said casing adjacent said outlet with the other end spaced substantially opposite said outlet and movable toward and from the outlet upon influx of hot and cold fluid respectively into said casing, said second-mentioned end of said strip having an opening therethrough in substantial alinement with said outlet, a valve rod mounted on the inner side of said second-mentioned end of the strip and having a reduced portion to loosely fit said opening whereby the rod is movable longitudinally with and relatively to said strip toward and from said outlet, and a float fixedly mounted on said rod between said strip and said outlet to actuate said valve rod independently of said strip to close said outlet upon influx of liquid into said casing.

3. A valve of the character described, comprising a casing having an inlet and an outlet, a substantially semi-circular thermostatic strip having one end fixedly secured to said casing adjacent said outlet and the other end distantly spaced substantially opposite said outlet and movable toward and from said outlet upon influx of hot and cold fluid respectively into said casing, said second-mentioned end of the strip having an opening therein in substantial alinement with said outlet, and a valve rod mounted on the inner side of said second-mentioned end of said strip and having a reduced portion loosely fitting said opening, said valve rod also having a reduced portion at its other end to loosely fit in said outlet, whereby said valve rod is longitudinally moved by said thermostatic strip to close and open said outlet and said opening in said strip and said first-mentioned reduced portion permit said valve rod to adjust itself relatively to said strip and said outlet to properly close said outlet.

EDWARD JACOBUS.